(12) United States Patent
Talen et al.

(10) Patent No.: US 12,258,889 B2
(45) Date of Patent: Mar. 25, 2025

(54) LUBRICANT DELIVERY SYSTEM AND METHOD

(71) Applicant: Unist, Inc., Grand Rapids, MI (US)

(72) Inventors: Zachary E. Talen, Grand Rapids, MI (US); Timothy J. Bangma, Lowell, MI (US)

(73) Assignee: Unist, Inc., Grand Rapids, MI (US)

( * ) Notice: Subject to any disclaimer, the term of this patent is extended or adjusted under 35 U.S.C. 154(b) by 0 days.

(21) Appl. No.: 18/543,620

(22) Filed: Dec. 18, 2023

(65) Prior Publication Data

US 2024/0117760 A1 Apr. 11, 2024

Related U.S. Application Data

(62) Division of application No. 17/507,849, filed on Oct. 22, 2021, now Pat. No. 11,846,213.

(60) Provisional application No. 63/104,590, filed on Oct. 23, 2020.

(51) Int. Cl.
*F01M 1/16* (2006.01)
*F16N 11/08* (2006.01)
*F01M 1/02* (2006.01)

(52) U.S. Cl.
CPC .............. *F01M 1/16* (2013.01); *F16N 11/08* (2013.01); *F01M 2001/0215* (2013.01)

(58) Field of Classification Search
CPC ....... F01M 1/16; F16N 7/385; F16N 2270/20; F16N 2270/48
See application file for complete search history.

(56) References Cited

U.S. PATENT DOCUMENTS

| 5,531,085 | A | * | 7/1996 | Hayes | B05B 12/00 |
| | | | | | 72/39 |
| 6,470,247 | B1 | * | 10/2002 | Meyer | F15B 19/005 |
| | | | | | 701/33.9 |
| 11,846,213 | B2 | * | 12/2023 | Talen | F16N 21/04 |
| 2012/0247876 | A1 | * | 10/2012 | Kreutzkamper | F16N 7/385 |
| | | | | | 184/14 |
| 2013/0277148 | A1 | * | 10/2013 | Beck | F16N 29/02 |
| | | | | | 184/7.4 |

(Continued)

OTHER PUBLICATIONS

International Search Report and Written Opinion of the International Searching Authority from corresponding Patent Cooperation Treaty (PCT) Patent Application No. PCT/IB2021/059754, mailed Jan. 27, 2022.

*Primary Examiner* — Michael A Riegelman
(74) *Attorney, Agent, or Firm* — Gardner, Linn, Burkhart & Ondersma LLP

(57) ABSTRACT

A lubricant delivery system and method includes a valve manifold, an electronic controller, and a pressure sensor for determining whether there is adequate lubricant flow in the system. The valve manifold receives lubricant from a pressurized source. The valve manifold includes a plurality of valves configured to control the flow of lubricant to respective applicators. The electronic controller controls the opening and closing of the valves. The pressure sensor measures lubricant pressure in the valve manifold, and outputs a signal to the electronic controller. The signal correlates to a lubricant pressure value in the valve manifold. The electronic controller uses the lubricant pressure values to derive an indication of lubricant flow (via the valves) to the applicators.

20 Claims, 5 Drawing Sheets

(56) References Cited

U.S. PATENT DOCUMENTS

| | | | |
|---|---|---|---|
| 2014/0236432 A1* | 8/2014 | Haisler | E02F 9/267 |
| | | | 701/33.9 |
| 2015/0107329 A1* | 4/2015 | Conley | F16N 29/00 |
| | | | 73/7 |
| 2016/0290848 A1* | 10/2016 | Conley | F16N 31/00 |
| 2017/0038003 A1* | 2/2017 | Conley | F16N 7/385 |
| 2017/0058728 A1* | 3/2017 | Lehman | F01M 1/02 |
| 2017/0066096 A1* | 3/2017 | Boelkins | B23Q 11/1046 |
| 2017/0066097 A1* | 3/2017 | Bangma | B05B 7/0876 |
| 2017/0113315 A1* | 4/2017 | Bangma | B23Q 11/1046 |
| 2017/0114957 A1* | 4/2017 | Conley | F16N 29/02 |
| 2018/0017210 A1* | 1/2018 | Letscher | F16N 29/02 |
| 2018/0058278 A1* | 3/2018 | Spiegl | F01M 1/18 |
| 2018/0202603 A1* | 7/2018 | Guenther | F16N 7/385 |
| 2019/0211720 A1* | 7/2019 | Berkemeier | F02M 25/00 |
| 2019/0368380 A1* | 12/2019 | Manzoni | F02C 7/06 |
| 2020/0039016 A1* | 2/2020 | Boelkins | F16N 7/32 |
| 2020/0347990 A1* | 11/2020 | McKim | F16N 25/00 |
| 2021/0271237 A1* | 9/2021 | Gebauer | G05B 23/0264 |
| 2022/0062935 A1* | 3/2022 | Bangma | B05B 7/12 |
| 2022/0127980 A1* | 4/2022 | Talen | B05B 12/085 |
| 2023/0407764 A1* | 12/2023 | Fert | F01D 25/18 |
| 2024/0117760 A1* | 4/2024 | Talen | F16N 11/08 |

\* cited by examiner

LUBRICANT DELIVERY SYSTEM AND METHOD

CROSS REFERENCE TO RELATED APPLICATIONS

This application is a divisional of U.S. patent application Ser. No. 17/507,849, filed Oct. 22, 2021, now U.S. Pat. No. 11,846,213, which claims the filing benefits of U.S. provisional application, Ser. No. 63/104,590, filed Oct. 23, 2020, which are hereby incorporated by reference herein in their entireties.

FIELD OF THE INVENTION

The present invention is directed to liquid delivery systems, such as lubricant delivery systems that apply a layer of lubricant onto a substrate.

BACKGROUND OF THE INVENTION

Industrial processes often require the reliable and consistent delivery of liquid to an applicator mechanism. Examples of such applications include coating metal with lubricant before cutting or forming processes, coating metal with a rust preventative for long-term storage, or coating wires with hydrated dry film lubricant useful for downstream processing. In each of these cases, there is an optimal thickness of the layer of the liquid to be deposited on the substrate. To achieve a consistent layer thickness of the liquid, the ratio of the substrate speed to the rate of material deposition by a nozzle or other applicator must be maintained in order to provide a consistent coating. Insufficient coating can lead to process errors and over-coating is wasteful. Thus, the flow of liquid must be monitored and maintained for optimal results.

SUMMARY OF THE INVENTION

Embodiments of the present invention provide for a lubricant delivery system configured to deliver lubricant to an applicator for metal forming and stamping operations. The lubricant delivery system is also configured to detect whether lubricant was adequately delivered to the applicator. The lubricant delivery system includes a valve manifold with a pressure sensor used to derive an indication of lubricant flow from pressure readings. This allows the lubricant delivery system to monitor the lubricant flow rate and permits rapid adjustments if needed, without halting or slowing the substrate.

According to one form of the present invention, a lubricant delivery system includes a valve manifold, an electronic controller, and a pressure sensor. The valve manifold receives lubricant from a pressurized source. The valve manifold includes a plurality of valves, each valve configured to control the flow of lubricant to a respective applicator. The electronic controller controls the opening and closing of the valves. The pressure sensor measures the pressure of the lubricant in the valve manifold and sends a signal to the electronic controller indicative of the pressure of the lubricant in the valve manifold. The electronic controller uses received lubricant pressure values to derive an indication of lubricant flow to the applicators.

According to another form of the present invention, a method is provided for deriving lubricant flow from a valve that receives a lubricant from a pressurized source. The method includes commanding a first valve of a valve manifold to open and supply lubricant to an applicator. A first pressure drop value of a lubricant pressure in the valve manifold is determined when the first valve is opened. The first pressure drop value is compared to a predetermined pressure drop limit or threshold value for the first valve. An indication of lubricant flow from the first valve is then derived by comparing the first pressure drop value to the predetermined pressure drop limit or threshold value for the first valve.

In one aspect of the present invention, the electronic controller controls the opening and closing of individual valves.

In another aspect, the electronic controller records a first lubricant pressure value when the first valve is closed and records a second lubricant pressure value when the first valve is opened. A first pressure drop value for the first valve is determined as the difference between the first lubricant pressure value and the second lubricant pressure value. The electronic controller uses the first pressure drop value to derive an indication of lubricant flow from the first valve.

In a further aspect, the electronic controller has a memory that includes a plurality of predetermined pressure drop limit or threshold values, each value corresponding to a particular valve. The electronic controller derives an indication of lubricant flow from the first valve by comparing the first pressure drop for the first valve to a predetermined pressure drop limit or threshold value for the first valve.

In yet another aspect, the electronic controller determines and signals that the first valve did not open, or that a supply line downstream of the first valve is clogged, when it determines that a pressure drop value for the first valve is zero.

In a further aspect, the electronic controller determines that a flow rate of lubricant from the first valve is below an expected flow rate when the pressure drop value for the first valve is above zero but below an expected value of the predetermined pressure drop limit or threshold for the first valve. The electronic controller may also determine that a flow rate of lubricant from the first valve is above a high limit when the pressure drop value for the first valve is found to be above the expected threshold value and also above a high limit value of the predetermined pressure drop limit or threshold for the first valve.

In another aspect, the lubricant may be a cutting or process lubricant, a corrosion preventative solution, or a hydrated dry film lubricant. Furthermore, the applicators may be roll coating lubrication applicators, or spray nozzles, for example.

Thus, the lubricant delivery system and methods of the present invention can detect whether lubricant, supplied to a valve manifold, was adequately delivered to a selected applicator during a process or manufacturing operation. A pressure sensor for measuring the lubricant pressure in the valve manifold is used to derive indications of lubricant flow adequacy or inadequacy.

These and other objects, advantages, purposes and features of the present invention will become apparent upon review of the following specification in conjunction with the drawings.

DETAILED DESCRIPTION OF THE PREFERRED EMBODIMENTS

Figure 1:
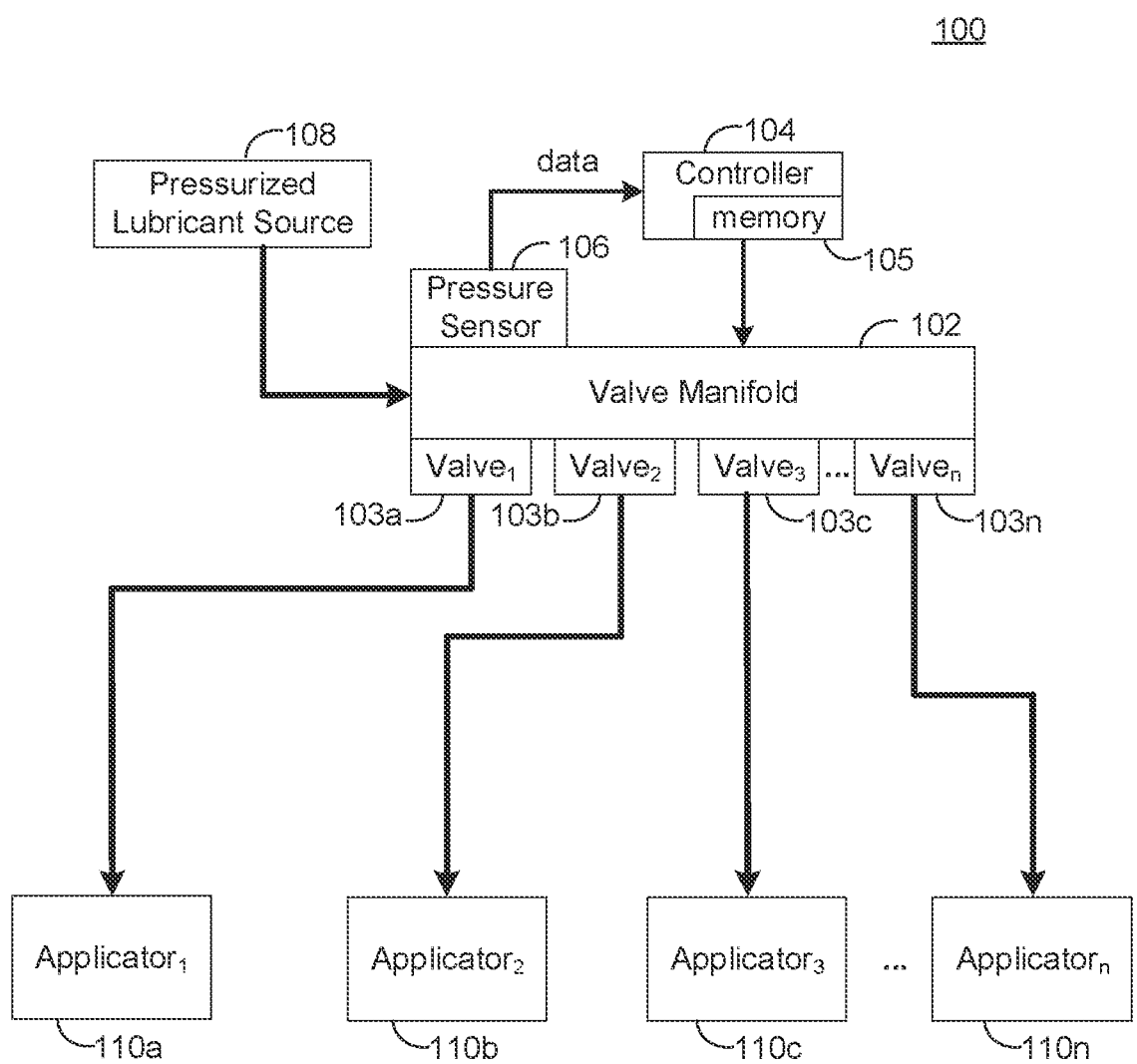
FIG. 1 is a block diagram of an exemplary lubricant delivery system in accordance with an embodiment of the present invention.

Referring now to the drawings and the illustrative embodiments depicted therein, a lubricant delivery system 100 delivers lubricant to an applicator, such as a nozzle, for process and manufacturing operations, e.g., metal forming and stamping operations. The lubricant delivery system can detect whether lubricant was adequately delivered to the applicator during the process/manufacturing operation. The reliable and consistent delivery of that lubricant is important for ensuring process dependability and longevity. In metal stamping and forming operations, for example, inadequate lubrication supplied to the lubrication applicator can lead to parts defects and decreased tool life. Too much lubricant supplied is wasteful and can cause safety hazards. The lubricant delivery system described herein can detect whether adequate lubrication has been delivered to the applicator so that the process can be halted, or flow altered, before failure occurs. Using a pressure sensor to derive indications of lubricant flow adequacy, as described herein, is a low-cost alternative to conventional solutions that require the use of an expensive flow meter, which can be many times more expensive than a pressure sensor.

Referring now to FIG. 1, the lubricant delivery system 100 includes a pressurized lubricant supply 108, a lubricant distribution valve manifold 102 supporting a plurality of valves 103a-n, and an electronic controller 104. Each valve 103a-n of the valve manifold 102 is in fluid communication with a corresponding applicator 110a-n, such as a roll coating lubrication applicator (a "roller") or a spray nozzle. The lubricant delivery system 100 also includes a pressure sensor 106 configured to measure the changing lubricant pressure values in the valve manifold 102. The pressure sensor 106 provides the electronic controller 104 with a data signal that correlates to the pressure of the lubricant in the valve manifold 102. The pressure sensor 106 may be an exemplary pressure sensor that uses any of a variety of different pressure measurement methods (e.g., absolute, gauge, and differential), a variety of different sensing principles (e.g., resistive, capacitive, piezoelectric, and MEMS), and a variety of different output signals (e.g., transducer and transmitter). These pressure measurement values (of the data signal from the pressure sensor 106) are received by the electronic controller 104 and used to derive an indication of lubricant flow to the applicator(s) 110a-n.

The valves 103a-n are independently controlled by the electronic controller 104. When lubricant is needed at a particular applicator 110a-n, a corresponding valve 103a-n is opened by the electronic controller 104. Generally, only a single valve (e.g., valve 103a) will be open at a time to supply lubricant to an applicator (e.g., applicator 110a). However, two or more valves (e.g., valves 103a-b) may be opened at the same time to apply lubricant to a plurality of applicators (e.g., applicators 110a-b). For example, if the applicator is a roller, generally only a single valve (e.g., valve 103a) will be opened to supply that corresponding applicator (e.g., applicator 110a) with lubricant for its roll coating lubrication application. If there are multiple applicators that are rollers, then generally only one of the applicators will be supplied with lubricant at a time. However, if a plurality of applicators are sprayers, then a plurality of corresponding valves 103a-n could be opened to supply lubricant to them all. A single valve may supply lubricant to one or more applicators that are sprayers. That is, a single applicator (e.g., applicator 110a) can be a single roller or one or more sprayers.

When a valve 103a-n is opened, the electronic controller 104 will compare received pressure measurement values to expected pressure measurement values (for specific valves, such as valve 103a) that are recorded in a memory 105 of the electronic controller 104. The electronic controller 104 is operable to open and close the valves 103a-n. When a valve opens, the lubricant pressure in the valve manifold 102 drops as lubricant flows out of the open valve. Likewise, when the valve closes, the pressure then rises back to the set pressure of the pressurized fluid supply 108. The electronic controller 104 records a pressure measurement value in the valve manifold 102 before an exemplary valve, e.g., valve 103a, is opened and then records a minimum pressure measurement value seen while the valve 103a is opened. The difference between the initial pressure measurement value (with the valve 103a closed and no lubricant flowing to the applicator 110a) and the minimum pressure measurement value (with the valve 103a open and lubricant flowing towards the applicator 110a) is a measured pressure drop for the valve 103a. The measured pressure drop is then compared to one or more expected low flow and high flow limit values to determine whether a desired quantity of lubricant is being adequately delivered to the associated applicator 110a. The measured pressure drop may be used to indicate whether a lubricant flow is too low or nonexistent, or alternatively, too high.

Figure 2:
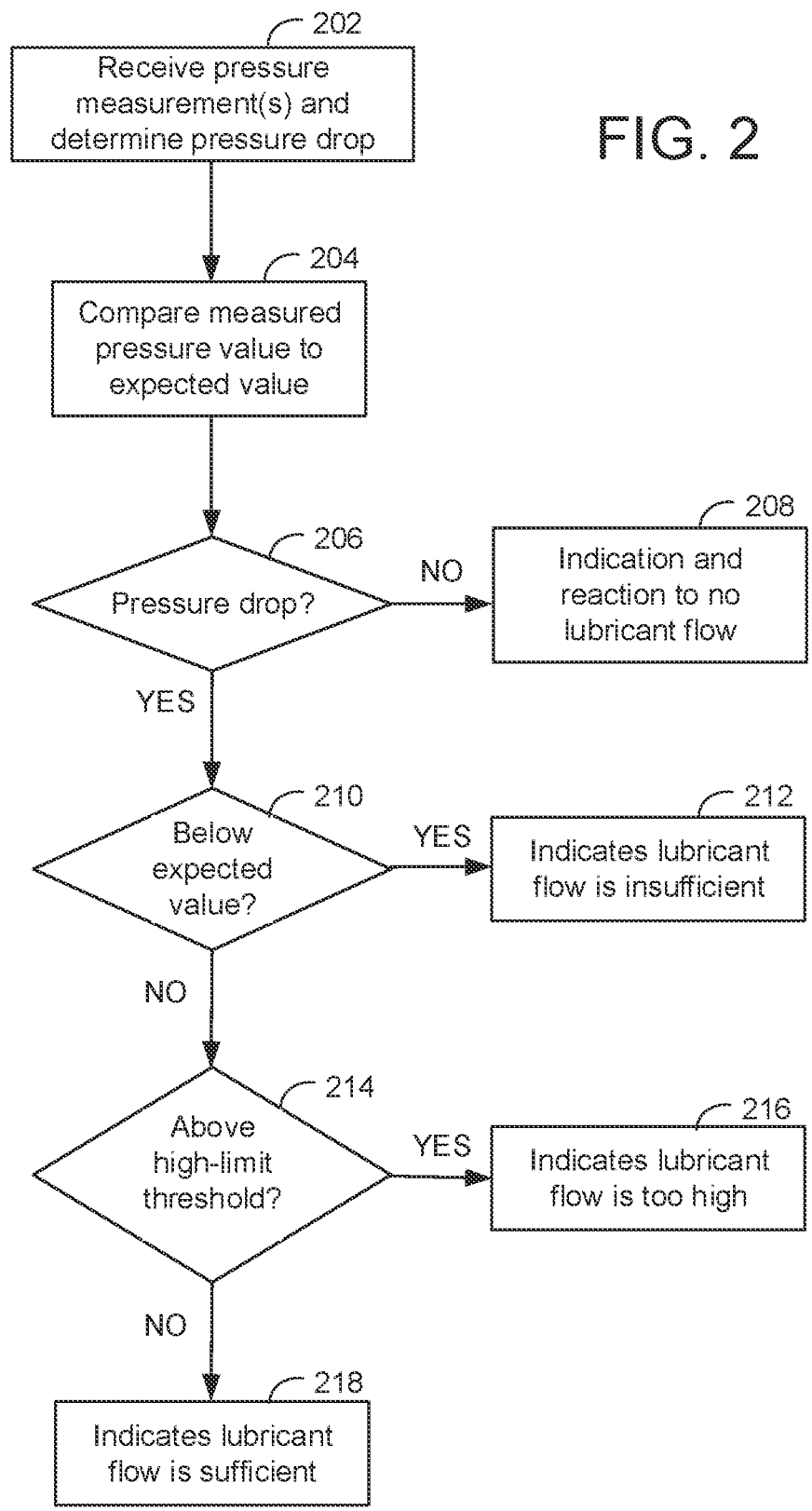
FIG. 2 is a flow diagram illustrating the use of pressure measurement values to derive an indication of lubricant flow in the lubricant delivery system of FIG. 1.

A method for determining if the lubricant flow out of a valve when the valve is opened is within expected limits may be understood with reference to FIG. 2. A pressure measurement value(s) is received 202 when a valve has been opened (e.g., valve 103a of FIG. 1). These pressure values include both a measurement of the pressure in the valve manifold 102 before the valve 103 is opened as well as a measurement of the pressure in the valve manifold 102 after the valve 103 is opened. The difference between these two pressure measurement values is the pressure drop observed or detected when this particular valve 103, e.g., valve 103a, is opened.

The current pressure drop is compared 204 to a plurality of predetermined values. The measured pressure drop is compared 206 with a zero pressure drop. If the measured pressure drop is not greater than zero, then in step 208 of FIG. 2, the electronic controller 104 determines that because there is no pressure drop, no lubricant moved through the conduit to the corresponding applicator, and therefore, it may be determined that the valve did not open or a flow path downstream of the valve is clogged. Such an indication (of no lubricant movement) means that inadequate lubrication is being supplied to the applicator 110 in question and this information can be used by the electronic controller 104 to halt the process at step 208 of FIG. 2. If, in the alternative, the measured pressure drop is greater than zero, the flow diagram continues with step 210.

In step 210, if the measured pressure drop is greater than zero, the measured pressure drop is compared to an expected value. The expected value is a predefined desired limit or minimum threshold corresponding to an expected flow of lubricant. If the measured pressure drop is below the predefined expected minimum value, then in step 212 of FIG. 2, the electronic controller 104 determines that because the measured pressure drop is greater than zero, but below the expected minimum value, the lubricant flow rate is too low and not enough lubricant is being delivered. Such an indication (that too little lubricant is being delivered) can be used to halt the process at step 212. If, in the alternative, the measured pressure drop is greater than the expected minimum value, the method continues with a high-limit measurement step 214.

In step 214, if the measured pressure drop is greater than the expected minimum value, the measured pressure drop is compared to a high-limit threshold. If the measured pressure drop is above the high-limit threshold, then in step 216, the electronic controller 104 determines that because the measured pressure drop is above the high-limit threshold, the lubricant flow rate is too high, leading to lubricant waste. Alternatively, a measured pressure drop above the high-limit threshold can also be an indication of air present in the lubricant delivery system 100. Such an indication (that too much lubricant is being delivered, or that air is present in the system) can be used to halt the process at step 216. If the measured pressure drop is greater than the expected minimum value (from step 210), but below the high-limit threshold (from step 214), the electronic controller 104 is able to derive an indication that an adequate quantity of lubricant is being delivered to the applicator 110.

There are various methods available for determining the desired, pre-determined values for high lubricant flow and low lubricant flow. These pre-determined values can be determined manually or automatically, e.g., by the electronic controller 104. Predetermined pressure drop values for a particular valve 103, e.g., valve 103a, may be determined by first recording a pressure measurement value while the valve 103a is closed and then recording another pressure measurement value after the valve 103a is opened (and an adequate lubricant flow has been otherwise confirmed). The difference between these two pressure measurement values would be the predetermined pressure drop for a normal flow from the particular valve. High flow and low flow limits would thus be based upon the expected normal flow value for the valve.

Figure 3:
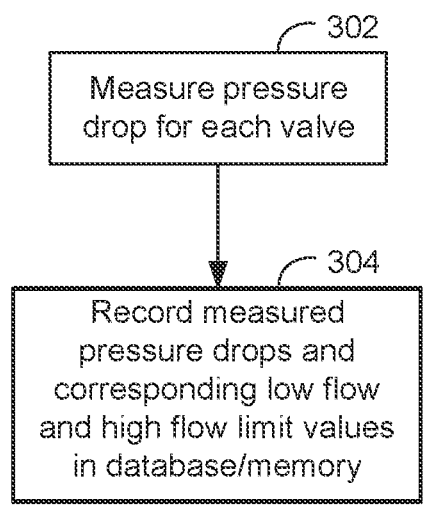
FIG. 3 is a flow diagram illustrating the measuring of pressure values to be used as expected pressure drop values for the lubricant delivery system of FIG. 1.

A method for determining the expected pressure drop values (for particular valve openings) is reflected in the flow diagram of FIG. 3. In step 302, one or more lubricant pressure drops (and corresponding low and high limits) are measured for one or more valves. If one or more valves supply a substantially different lubricant rate to an applicator, as compared to the other valves (and corresponding applicators), then each of the valves may be individually opened and a measured pressure drop determined for each. For example, should opening the first valve 103a result in a pressure drop that is substantially higher (or lower) than a pressure drop due to any of the other valves 103b-n, then a predetermined pressure drop would be determined for the operation of the first valve 103a as well as a predetermined pressure drop determined for at least one of the remaining valves 103b-n. With these predetermined pressure drop values, a corresponding set of high flow and low flow limits can then be derived from the predetermined pressure drops for the corresponding valves. In step 304, the predetermined pressure drops and/or the high flow and low flow limit values for each valve are recorded in a database for the electronic controller 104. The database may be stored in the memory 105 of the electronic controller 104.

Figure 4A:
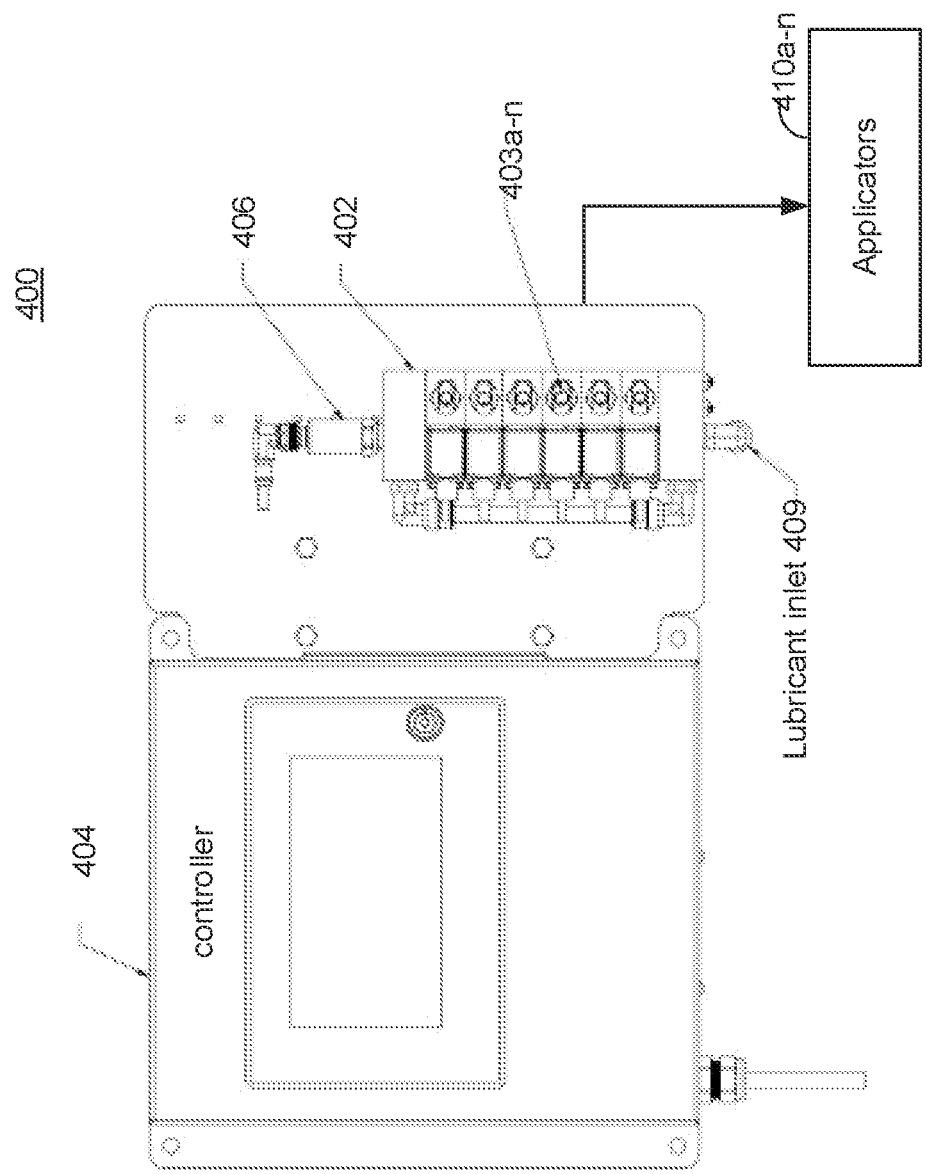
FIG. 4A is a front elevation view of an alternative lubricant delivery system in accordance with an embodiment of the present invention.
Figure 4B:
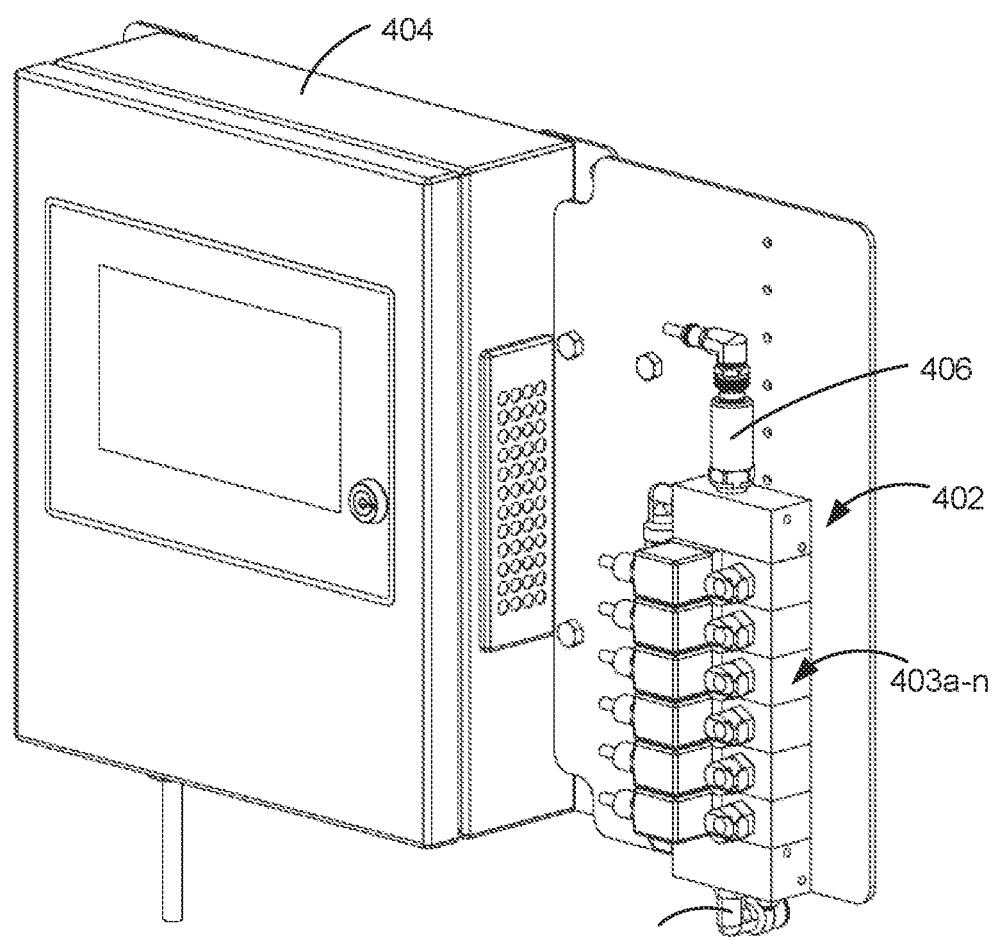
FIG. 4B is a perspective view of the lubricant delivery system of FIG. 4A.

Referring now to FIGS. 4A and 4B, an exemplary lubricant delivery system 400 includes a lubricant distribution valve manifold 402 and an electronic controller 404. The valve manifold 402 receives pressurized lubricant via an inlet 409. The valve manifold 402 also includes a series of valves 403a-n, with each valve 403a-n controlling the flow of lubricant to a corresponding applicator 410a-n. Lastly, a pressure sensor 406 is coupled to the valve manifold 402 to measure lubricant pressure in the valve manifold 402. The electronic controller 404 of FIGS. 4A and 4B controls the operation of the valve manifold 402 and monitors the flow of lubricant through the valve manifold 402 to applicators 410a-n via pressure measurement values that are received by the electronic controller 404 from the pressure sensor 406. The processing and analysis of the received pressure measurement values by the electronic controller 404 to determine whether an adequate quantity of lubricant is flowing to the applicator(s) 410a-n is similar to the processing and analysis of received pressure measurement values by the electronic controller 104 to determine whether an adequate quantity of lubricant is flowing to the applicators(s) 110a-n (see FIG. 1 as described above), and thus will not be repeated.

Thus, the exemplary lubricant delivery systems provide a monitored flow of lubricant to applicators (e.g., rollers and sprayers), with the monitoring of lubricant flow determined from the output of a pressure sensor that monitors the pressure of a valve manifold of the lubricant delivery system. By comparing measured pressure drops when a particular valve is opened to the expected pressure drop values for that valve, a determination can be made as to whether there is a sufficient flow of lubricant to an applicator. Using a pressure sensor to monitor lubricant flow adequacy is an alternative to more costly conventional solutions that require the use of a flow meter.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. Therefore, it will be appreciated that changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method for deriving an indication of lubricant flow from a valve of a valve manifold that receives a lubricant from a pressurized source, the method comprising:
   opening a first valve of the valve manifold to supply lubricant to an applicator;
   measuring a first pressure level of the valve manifold while the first valve of the valve manifold is open;
   determining a first pressure drop value for the valve manifold based upon the first pressure level; and
   comparing the first pressure drop value to a pressure drop threshold value for the first valve to derive an indication of lubricant flow from the first valve.

2. The method of claim 1, wherein the valve manifold comprises a plurality of valves, each valve of the plurality of valves supplying lubricant to a respective applicator, and wherein individual valves of the plurality of valves are opened and closed.

3. The method of claim 1 further comprising measuring a second lubricant pressure value when the first valve is closed, and determining the first pressure drop value for the first valve by comparing the first lubricant pressure value to the second lubricant pressure value, wherein the second lubricant pressure value is measured before the first valve is opened.

4. The method of claim 1 further comprising determining that lubricant flow from the first valve is nonexistent, or determining that the lubricant flow is blocked, either because the first valve did not open or a supply line downstream of the first valve is clogged, when the first lubricant pressure drop value is zero.

5. The method of claim 1 further comprising determining that the lubricant flow from the first valve is inadequate when the first lubricant pressure drop value is above zero but below the pressure drop threshold value for the first valve.

6. The method of claim 1 further comprising determining that the lubricant flow from the first valve is excessive when the first lubricant pressure drop value is above the pressure drop threshold value and also above a high limit threshold value for the first valve, wherein the high limit threshold value is higher than the pressure drop threshold value.

7. The method of claim 1, wherein the lubricant is one of a cutting lubricant or process lubricant, a corrosion preventative solution, and a hydrated dry film lubricant.

8. The method of claim 1, wherein the applicator comprises a roll coating lubrication applicator or one or more spray nozzles.

9. The method of claim 1 further comprising controlling the opening and closing of selected combinations of valves of the plurality of valves.

10. The method of claim 9, wherein each valve of the selected combination of valves controls the flow of lubricant to a respective selected applicator.

11. The method of claim 9, wherein each of the selected applicators are spray nozzles.

12. A method for deriving an indication of lubricant flow from a valve of a valve manifold that receives a lubricant from a pressurized source, the method comprising:
 opening a first valve of the valve manifold to supply lubricant to a first applicator;
 measuring a first pressure level of the valve manifold while the first valve of the valve manifold is open;
 closing the first valve of the valve manifold;
 deriving a first pressure drop threshold value for the first valve based upon the first pressure level, wherein the first pressure drop threshold value defines an indication of adequate lubricant flow from the first valve based upon a measured pressure level of the valve manifold while the first valve is open; and
 recording the first pressure drop threshold value into a memory.

13. The method of claim 12, wherein the valve manifold comprises a plurality of valves, each valve of the plurality of valves selectively supplying lubricant to a respective applicator, wherein the method further comprises deriving a pressure drop threshold value for any valve of the plurality of valves based upon the first pressure level when the first pressure level and a pressure level of the valve manifold associated with any of the respective valves of the plurality of valves are substantially the same value.

14. The method of claim 12 further comprising:
 opening a second valve of the valve manifold to supply lubricant to a second applicator;
 measuring a second pressure level of the valve manifold while the second valve of the valve manifold is open;
 closing the second valve of the valve manifold;
 opening both the first valve and the second valve of the valve manifold to supply lubricant to the first applicator and the second applicator, respectively;
 measuring a third pressure level of the valve manifold while the first valve and the second valve of the valve manifold are opened;
 deriving a second pressure drop threshold value for the second valve based upon the second pressure level, wherein the second pressure drop threshold value defines an indication of adequate lubricant flow from the second valve based upon a measured pressure level of the valve manifold while the second valve is open;
 deriving a third pressure drop threshold value for both the first valve and the second valve based upon the third pressure level, wherein the third pressure drop threshold value defines an indication of adequate lubricant flow from both the first valve and the second valve based upon a measured pressure level of the valve manifold while both the first valve and the second valve are open; and
 recording the second pressure drop threshold value and the third pressure drop threshold value into the memory.

15. The method of claim 14, wherein the first pressure drop threshold value is based upon a known first pressure drop value in the valve manifold when just the first valve is opened, wherein the second pressure drop threshold value is based upon a known second pressure drop value in the valve manifold when just the second valve is opened, and wherein the third pressure drop threshold value is based upon a known third pressure drop value in the valve manifold when both the first valve and the second value are opened.

16. The method of claim 15, wherein the known first pressure drop value in the valve manifold is associated with a known lubricant flow to the first applicator, wherein the known second pressure drop value in the valve manifold is associated with a known lubricant flow to the second applicator, and wherein the known third pressure drop value in the valve manifold is associated with a known lubricant flow to both the first applicator and the second applicator.

17. The method of claim 15 further comprising measuring a fourth lubricant pressure value when all valves of the valve manifold are closed;
 determining a measured first pressure drop value for the first valve by comparing the measured first lubricant pressure value to the fourth lubricant pressure value;
 determining a measured second pressure drop value for the second valve by comparing the measured second lubricant pressure value to the fourth lubricant pressure value; and
 determining a measured third pressure drop value for both the first valve and the second valve by comparing the measured third lubricant pressure value to the fourth lubricant pressure value, wherein the fourth lubricant pressure value is measured before either of the first valve or the second valve are opened.

18. The method of claim 15, wherein the first pressure drop threshold value is defined by a lubricant flow from the first valve that is considered an inadequate lubricant flow to the first applicator, wherein the second pressure drop threshold value is defined by a lubricant flow from the second valve that is considered an inadequate lubricant flow to the second applicator, and wherein the third pressure drop threshold value is defined by a lubricant flow from both the first valve and the second valve that is considered an inadequate lubricant flow to the first applicator and the second applicator, respectively.

19. The method of claim 15 further comprising:
deriving a first high limit threshold value for the first valve based upon the first pressure level, wherein the first high limit threshold value is defined as an indication of an excessive lubricant flow from the first valve;
deriving a second high limit threshold value for the second valve based upon the second pressure level, wherein the second high limit threshold value is defined as an indication of an excessive lubricant flow from the second valve;
deriving a third high limit threshold value for both the first valve and the second valve based upon the third pressure level, wherein the third high limit threshold value is defined as an indication of an excessive lubricant flow from both the first valve and the second valve; and
recording the first high limit threshold value, the second high limit threshold value, and the third high limit threshold value in the memory.

20. The method of claim 12, wherein the lubricant is one of a cutting lubricant or process lubricant, a corrosion preventative solution, and a hydrated dry film lubricant, and wherein the applicator comprises a roll coating lubrication applicator or one or more spray nozzles.

\* \* \* \* \*